United States Patent [19]

Whitington

[11] Patent Number: 5,055,326

[45] Date of Patent: Oct. 8, 1991

[54] AUTOMOTIVE SUPPORTED POMPON

[76] Inventor: Clyde R. Whitington, Rte. 3, Box 58 #1, Longview, Tex. 75603

[21] Appl. No.: 508,828

[22] Filed: Apr. 13, 1990

[51] Int. Cl.$^5$ ............................................. D04D 7/08
[52] U.S. Cl. ......................................... 428/4; 428/31; 428/122
[58] Field of Search ...................... 40/604, 617; 428/4, 428/31, 122, 358

[56] References Cited

U.S. PATENT DOCUMENTS

| D. 265,409 | 7/1982 | Braasch | 428/4 X |
| 2,608,655 | 8/1952 | Riemann | 428/31 X |
| 3,068,487 | 12/1962 | Hain | 428/4 X |
| 3,560,313 | 2/1971 | Herkimer | 428/4 |
| 4,143,199 | 3/1979 | Bardon et al. | 428/4 X |
| 4,366,199 | 12/1982 | Grosjean | 428/4 X |
| 4,369,215 | 1/1983 | Offen et al. | 428/4 |
| 4,490,419 | 12/1984 | Sliva | 428/4 |
| 4,573,427 | 3/1986 | Konzak | 428/16 X |
| 4,786,535 | 11/1988 | Young | 428/4 |
| 4,876,981 | 10/1989 | Barnhart | 40/214 X |
| 4,886,687 | 12/1989 | Malott | 428/4 |

Primary Examiner—Henry F. Epstein
Attorney, Agent, or Firm—Leon Gilden

[57] ABSTRACT

A vehicular supported pompon is provided including a flexible "U" shaped support capturing an elongate flexible line therewith, wherein the flexible line includes loop members formed at each end for securement of the pompon within grooves and the like of vehicular construction, such as that defined between a hood and fender. The construction further includes a flexible spine with orthogonally formed finger ribbons extending therefrom, wherein the spine is captured between opposed sides of the support with stitches to secure the support and spine together. A further embodiment of the invention includes air actuated whistles to produce audible sound effects during traverse of the automobile when securing the pompon thereon. A further embodiment includes a series of fiber optic cables captured between the "U" shaped support with terminal ends directed exteriorly of the "U" shaped support for providing enhanced visual attention to the organization. The invention may include a yet further embodiment wherein a tubular "U" shaped support is positionable over an associated automotive antenna for positioning of the pompon thereon.

1 Claim, 5 Drawing Sheets

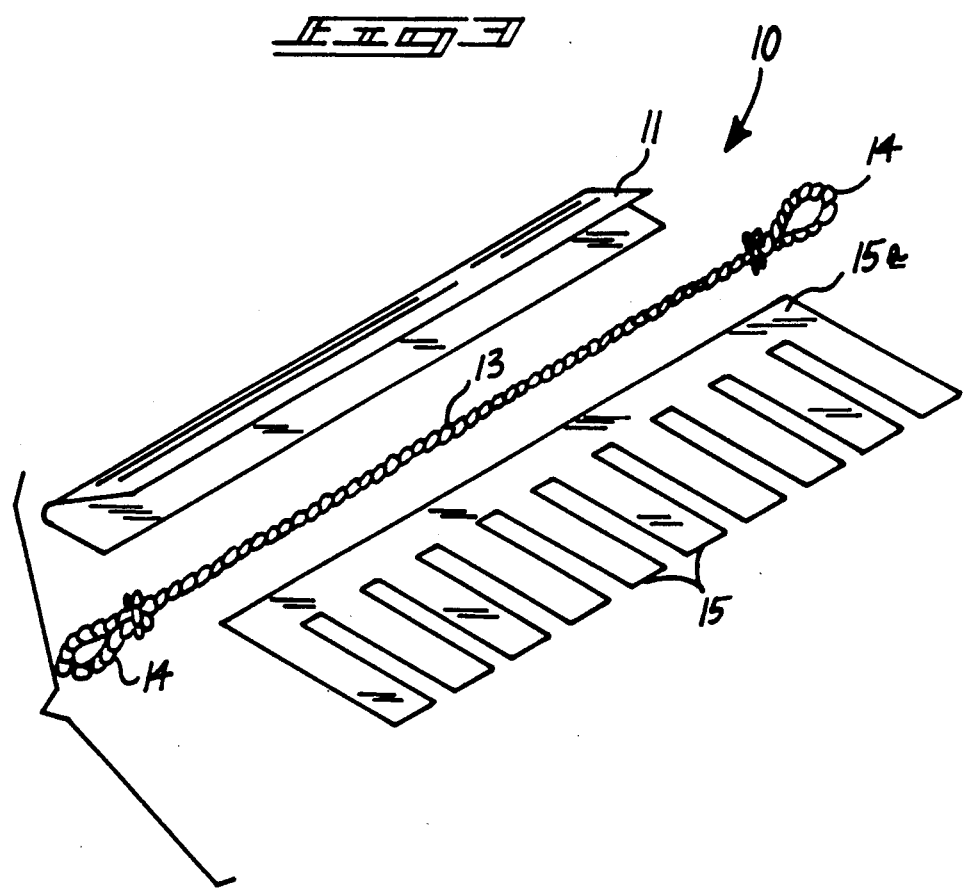
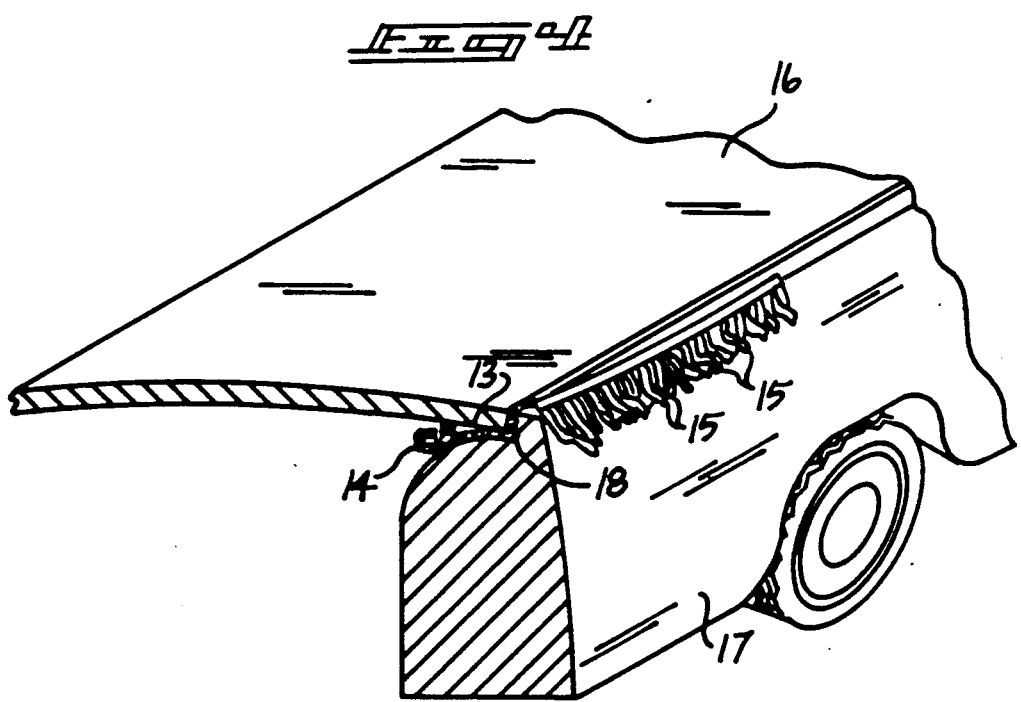

AUTOMOTIVE SUPPORTED POMPON

BACKGROUND OF THE INVENTION

1. Field of the Invention

The field of invention relates to pompon organizations, and more particularly pertains to a new and improved automotive supported pompon wherein the same is selectively securable to various portions of an automotive structure for securement to the automobile.

2. Description of the Prior Art

Pompon construction is known in the prior art for use as visual enhancement of various events such as football games, basketball games, and the like. An example of such construction may be found in U.S. Pat. No. 4,369,215 to Offen, et al., wherein a pompon is provided with a tubular body for positioning over a finger of an individual, wherein a series of streamers are directed coaxially of the tubular member.

U.S. Pat. No. 4,143,199 to Bardon sets forth the use of textile filaments for use in decorative environments wherein the filaments are characterized of substantially parallel yarns of high bulk with compressed zones and uncompressed zones to define a decorative filament construction.

U.S. Pat. No. 4,366,199 to Grosjean sets forth a decorative textile element comprising a series of parallel yarns secured to a main rib support.

U.S. Pat. No. 4,786,535 to Young sets forth a pompon arrangement wherein pull strings extending in opposite directions to the pompon to a tubular handle enables storage of the pompon within the handle during periods of non-use.

U.S. Pat. No. 3,560,313 to Herkimer provides a pompon arrangement formed with a central support with a "U" shaped handle mounted thereto with a matrix of filaments directed and secured to the handle to define a generally arcuately shaped head of filaments for use in a pompon arrangement.

As such, it may be appreciated that there is a continuing need for a new and improved automotive supported pompon arrangement which addresses both the needs of ease of use in securement to various portions of an automobile, such as in interfaces of the hood, trunk, and doors, as well as effectiveness in construction to provide a durable and effective pompon construction.

SUMMARY OF THE INVENTION

In view of the foregoing disadvantages inherent in the known types of pompon constructions now present in the prior art, the present invention provides an automotive supported pompon wherein the same is selectively securable to various interface portions of an automotive construction such as within the interface of a trunk lid and fenders and the hood and fenders, as well as secured to the door and framework of the automobile to provide a pompon arrangement for use in various sporting events and the like. As such, the general purpose of the present invention, which will be described subsequently in greater detail, is to provide a new and improved automotive support pompon which has all the advantages of the prior art pompon constructions and none of the disadvantages.

To attain this, the present invention includes a flexible "U" shaped support capturing an elongated flexible line therewith, wherein the flexible line includes loop members formed at each end for securement of the pompon within grooves and the like of vehicular construction, such as that defined between a hood and fender. The construction further includes a flexible spine with orthogonally formed finger ribbons extending therefrom, wherein the spine is captured between opposed sides of the support with stitches to secure the support and spine together. A further embodiment of the invention includes air actuated whistles to produce audible sound effect during traverse of the automobile when securing the pompon thereon. A further embodiment includes a series of fiber optic cables captured between the "U" shaped support with terminal ends directed exteriorly of the "U" shaped support for providing enhanced visual attention to the organization. The invention may include a yet further embodiment wherein a tubular "U" shaped support is positionable over an associated automotive antenna for positioning of the pompon thereon.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructionsinsofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive supported pompon which has all the advantages of the prior art pompon constructions and none of the disadvantages.

It is another object of the present invention to provide a new and improved automotive supported pompon which may be easily and efficiently manufactured and marketed.

It is a further object of the present invention to provide a new and improved automotive supported pompon which is of a durable and reliable construction.

An even further object of the present invention is to provide a new and improved automotive supported pompon which is susceptible of a low cost of manufacture with regard to both materials and labor, and which accordingly is then susceptible of low prices of sale to the consuming public, thereby making such automotive supported pompons economically available to the buying public.

Still yet another object of the present invention is to provide a new and improved automotive supported pompon which provides in the apparatuses and methods of the prior art some of the advantages thereof, while simultaneously overcoming some of the disadvantages normally associated therewith.

Still another object of the present invention is to provide a new and improved automotive supported pompon wherein the same is selectively securable to various interface and relatively movable portions of an automobile construction to secure the pompon therein for decorative use with the automobile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawing wherein:

FIG. 3 is an isometric illustration, somewhat exploded, illustrating the various components, their configuration and relationship.

FIG. 4 is an isometric illustration, taken partially in section, of an automotive construction with a pompon of the instant invention secured thereto.

DESCRIPTION OF THE PREFERRED EMBODIMENT

Figure 1:
FIG. 1 is an isometric illustration of a prior art pompon.

With reference now to the drawings, and in particular to FIGS. 1 to 8 thereof, a new and improved automotive supported pompon embodying the principles and concepts of the present invention and generally designated by the reference numerals 10, 10a, 10b, and 10c will be described.

Attention is directed to FIG. 1 wherein a prior art pompon organization typical of the prior art is illustrated by the numeral 1 that includes a central, tubular support 12 with a matrix of streamers 3 secured at their rearward terminal ends to a central nipple 4.

Figure 2:
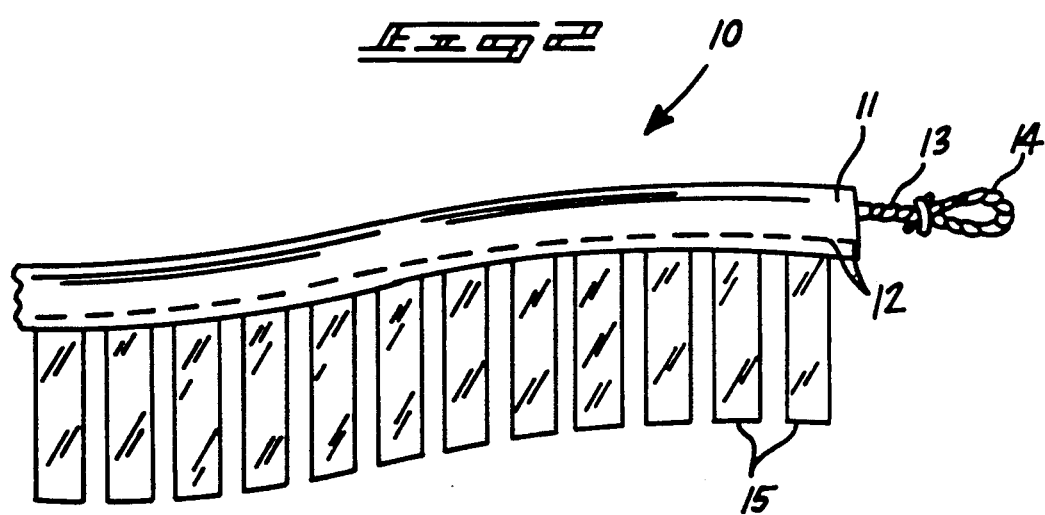
FIG. 2 is an orthographic view taken in elevation of the instant invention.

The automotive supported pompon 10 of the instant invention, as illustrated in FIG. 2, includes a flexible "U" shaped support 11 formed with a captured flexible line 13 coextensive with each end of the pompon and extending outwardly of each end terminating in an enlarged loop end portion 14. A support spine 15a integrally secures a series of parallel spaced finger ribbons 15 of flexible construction, wherein the spine 15a is captured between opposed interior terminal end surfaces of the "U" shaped support 11, wherein stitches 12 are directed through the side walls of the "U" shaped support 11 and through the spine 15a to effect the construction of the instant invention. FIG. 4 is illustrative of a typical use of the pompon construction of the instant invention, wherein a hood or trunk member 16 is securable between opposed fenders 17 of an automobile to define fender grooves 18. The enlarged loop end portions 14 are directed through the grooves 18 orthogonally thereto and positioned within a cavity defined underlying a hood or trunk lid to secure the organization 10 thereto, as illustrated in FIG. 4.

Figure 5:
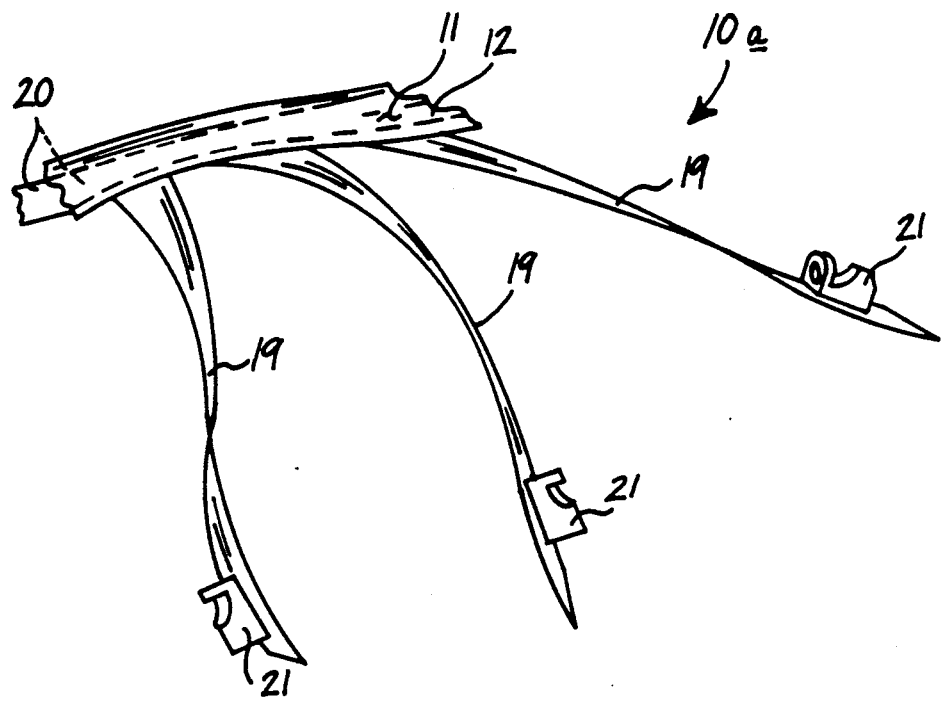
FIG. 5 is an isometric illustration of a modified pompon construction of the instant invention.

FIG. 5 is illustrative of a modified automotive supported pompon 10a wherein a series of flexible finger ribbons 19 extend orthogonally relative to a support spine 20 and a comparable manner to that illustrated in FIGS. 2 and 3. The modified pompon of FIG. 10a further includes stitching 12 to secure the spine 20 and capture the spine between opposed interior surfaces of the "U" shaped support 11. The finger ribbons 19 each includes an air activated whistle 21 mounted proximate a free terminal end of each of the ribbons 19 to effect an audible whistle upon directing of air past the whistles 21 in securement of the modified pompon 10a to a vehicle in a manner to that as illustrated in FIG. 4.

Figure 6:
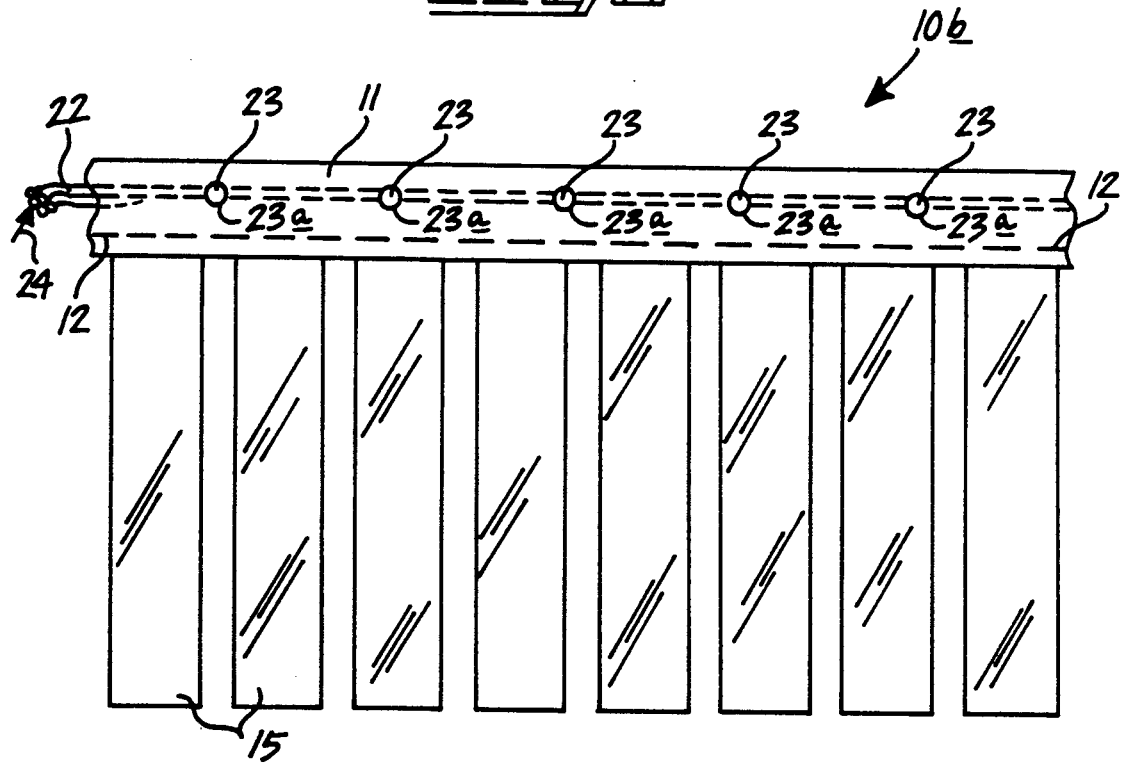
FIG. 6 is an orthographic view taken in elevation of a yet further pompon construction of the instant invention.

FIG. 6 is a further modified automotive supported pompon 10b wherein in addition to the securement of the finger ribbons 15 between the sides of the "U" shaped support by stitching 12, as noted above. Additionally, the modification as set forth in FIG. 6 includes a matrix of fiber optic filaments 22 wherein a terminal end of each of the filaments of the bundle of filaments 22 terminate through an apertures 23a directed through the "U" shaped support 11, wherein the remote ends of the bundle of filaments 22 are positioned adjacent a light source to direct light, as indicated by the arrow 24, to the filaments and provide visual enhancement in use of the pompon construction of the further modified pompon 10b, as illustrated in FIG. 6. The source of light may be one of the headlights of the automobile or a portable light source, such as a flash light, and the like, to direct light to the filaments 22.

Figure 7:
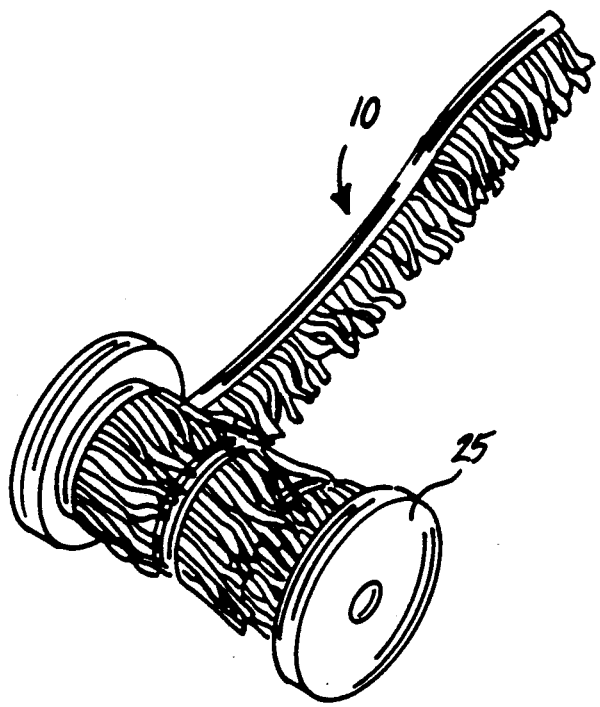
FIG. 7 is an isometric illustration of the instant invention secured to a central support spool.

FIG. 7 is illustrative of the pompon construction 10 in storage upon a spool 25 where desired lengths of the pompon construction 10 may be severed from the stored amount wound about the spool 25 for subsequent use.

Figure 8:
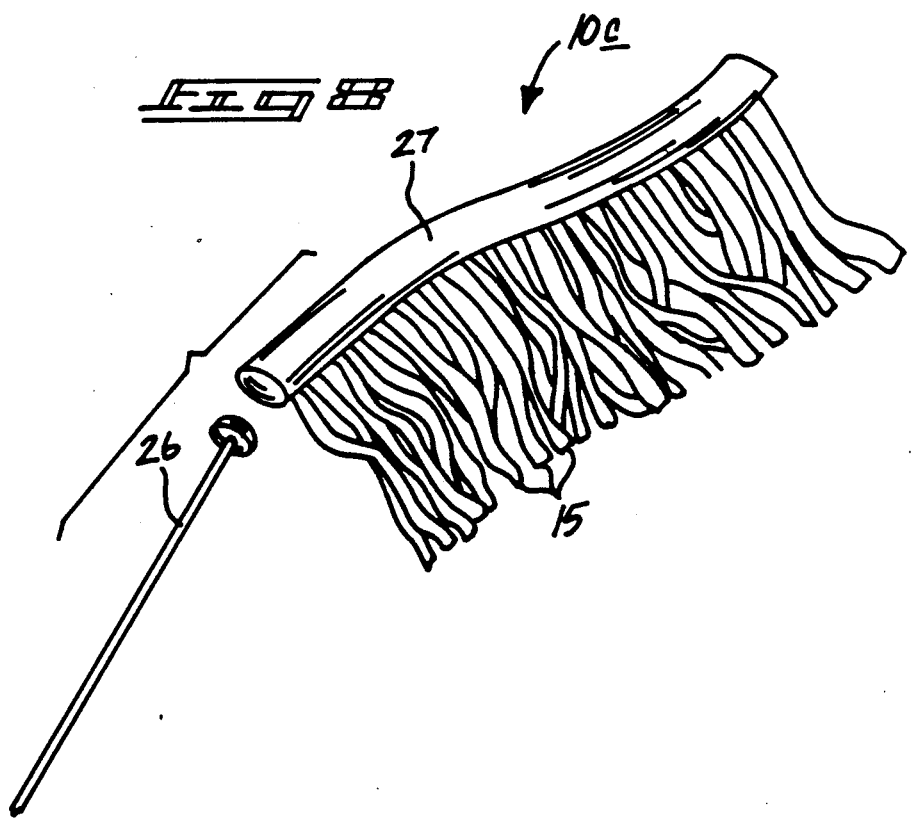
FIG. 8 is an isometric illustration of a still further modification of the instant invention for securement to an automotive antenna.

FIG. 8 illustrates a yet further modified automotive supported pompon construction 10c wherein a tubular support 27 secures the rearends 15 thereto, wherein the tubular support 27 is positionable overlying an associated automotive antenna 26.

Further it should be noted that the automotive pompon 10 may be also secured to the antenna, wherein the enlarged loop end portions 14 extending exteriorly of each end of the "U" shaped support 11 may receive the antenna 26 therethrough to position the organization 10 to the antenna.

Figure 9:
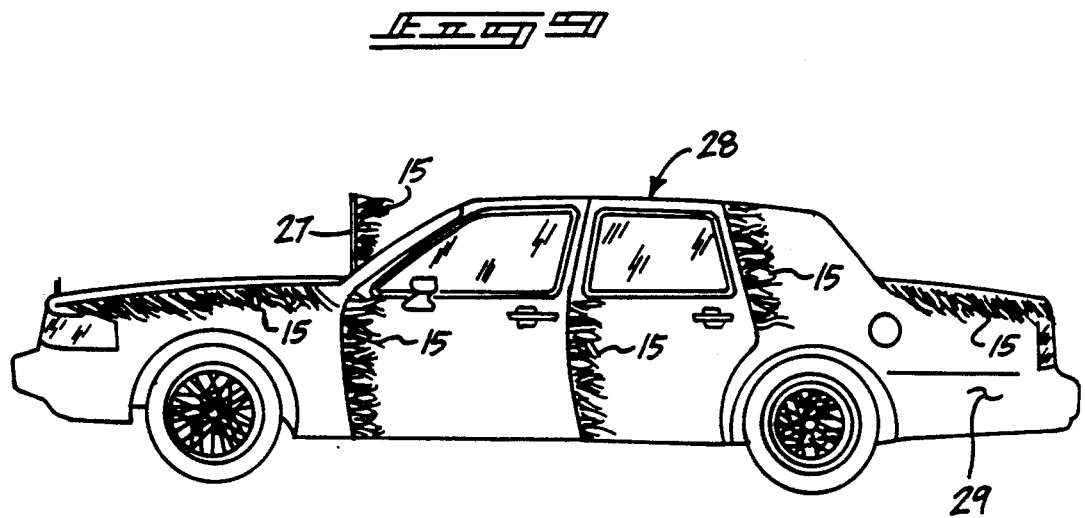
FIGS. 9 and 10 both illustrate an automotive construction with pompons of the instant invention secured thereto.
Figure 10:
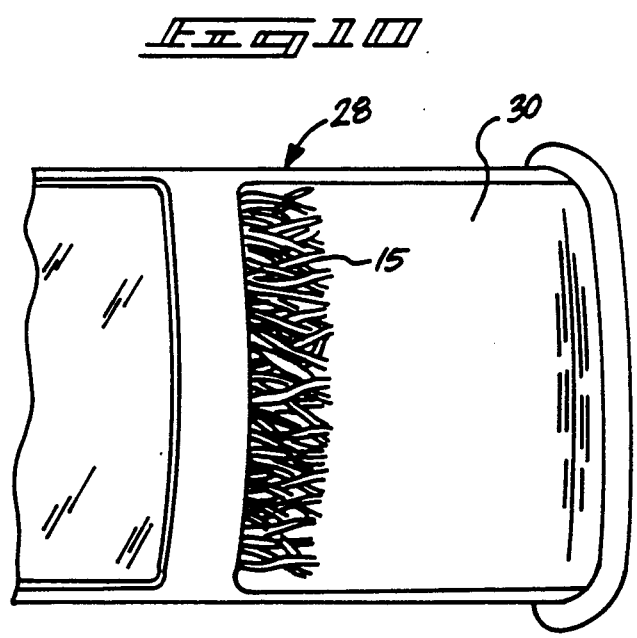

FIG. 9 illustrates the organization in association with a conventional automobile 28. The automobile 28 further includes a plurality of spaced conventional rear fenders 29, with a trunk lid 30 mounted between the rear fenders. The FIG. 9 illustrates the positioning in an array of the organization relative to the side doors of the automobile, mounted within the forward hood, onto the antenna, and mounted about the trunk lid, as illustrated in FIG. 9. FIG. 10 further notes that the organization may be mounted within the pivot hinge recess of the trunk lid 30, if desired, to coordinate the organization in a decorative and visually enhancing display relative to an associated automobile.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automotive supported pompon for securement to interface portions of an automobile, wherein the pompon comprises, a flexible "U" shaped support defining elongate coextensive legs overlying one another, wherein a flexible spine is mounted between the legs and further includes a series of spaced, parallel flexible finger ribbons orthogonally mounted to the spine, and wherein the spine is secured between the legs with ribbons extending beyond the legs exteriorly thereof, and an attachment means secured between the legs for securement of the pompon to the automobile, and wherein the attachment means further includes an elongate, flexible line member, and wherein the line member extends exteriorly beyond each end of the "U" shaped support, and the line member further includes an enlarged loop end portion formed to each end of the line member, and wherein the spine is stitched between the legs of the "U" shaped support to fixedly secure the spine thereto, and wherein the ribbons further include an air activated whistle fixedly mounted adjacent a free terminal end of the ribbons to effect an audible whistling of each whistle upon traverse of the automobile with the pompon secured thereto, and further including a matrix of fiber optic filaments directed exteriorly of the "U" shaped support, and wherein each fiber optic filament of a matrix of fiber optic filaments includes a terminal end extending through an aperture defined within a leg of the "U" shaped support to provide visual enhancement of the pompon upon directing of a light source through the matrix of fiber optic filaments to each respective end thereof, and wherein the matrix of fiber optic filaments is spaced above the flexible spine within the "U" shaped member, and wherein each end of a respective fiber optic filament is positioned through a single leg of said legs of the "U" shaped support.

* * * * *